(12) United States Patent
Deal

(10) Patent No.: US 7,615,894 B1
(45) Date of Patent: Nov. 10, 2009

(54) ELECTRIC MOTOR WITH A PERMANENT MAGNET CARRIER ROTATING A SPROCKET

(76) Inventor: Clarence D. Deal, 14000 N. Choctaw Rd., Jones, OK (US) 73049

(*) Notice: Subject to any disclaimer, the term of this patent is extended or adjusted under 35 U.S.C. 154(b) by 0 days.

(21) Appl. No.: 12/118,150

(22) Filed: May 9, 2008

Related U.S. Application Data

(60) Provisional application No. 60/917,963, filed on May 15, 2007.

(51) Int. Cl.
*H02K 41/03* (2006.01)
*H02K 41/00* (2006.01)

(52) U.S. Cl. .......................... 310/14; 310/12; 104/290; 318/135

(58) Field of Classification Search ................ 310/12, 310/14; 104/290; 198/805; 318/135
See application file for complete search history.

(56) References Cited

U.S. PATENT DOCUMENTS

| | | | |
|---|---|---|---|
| 204,481 A | 6/1878 | Cleveland | |
| 464,063 A | * 12/1891 | Collom | ............... 310/14 |
| 581,311 A | 4/1897 | Scovel et al. | |
| 695,524 A | 3/1902 | Woodell | |
| 757,800 A | 4/1904 | Williams | |
| 1,002,833 A | 9/1911 | Giddings | |
| 1,112,203 A | 9/1914 | Fandrey | |
| 1,132,445 A | * 3/1915 | Conrad | ............... 310/14 |
| 1,345,022 A | 6/1920 | Oliver | |
| 1,361,696 A | 12/1920 | Domenico | |
| 1,599,944 A | 9/1926 | Baumgart | |
| 1,600,105 A | 9/1926 | Fonkiewicz | |
| 1,783,669 A | 12/1930 | Oliver | |
| 3,282,632 A | 11/1966 | Arsem | |
| 3,355,584 A | 11/1967 | Baughman | |
| 3,439,189 A | 4/1969 | Petry | |
| 3,489,923 A | 1/1970 | Dahele | |
| 3,496,871 A | 2/1970 | Stengel | |
| 3,548,965 A | 12/1970 | Pierro | |
| 3,590,339 A | 6/1971 | Irwin et al. | |
| 3,616,978 A | * 11/1971 | Haslam | ............... 226/93 |
| 3,694,670 A | 9/1972 | Marzolf | |

(Continued)

FOREIGN PATENT DOCUMENTS

CA 2306491 A1 10/2001

(Continued)

*Primary Examiner*—Karl I Tamai
(74) *Attorney, Agent, or Firm*—Mary M. Lee

(57) ABSTRACT

A high voltage, low current electric motor. The motor comprises a drive shaft turned by a sprocket that is driven by an assembly of electromagnets. A carrier supporting permanent magnets travels in a tubular track formed into an endless loop around the sprocket. The carrier preferably comprises a chain formed of interconnected links, each link housing a magnet. The tubular track is non-ferrous and forms a core for a plurality of coils spaced around the tube. A sequencing circuit in the motor sequentially energizes the coils to cause the carrier to circulate around the tube by repelling and attracting the magnets. Teeth on the sprocket engage the chain so that as the chain travels through the tube the sprocket is rotated. Preferably, the coils are double-wound so that a direction control circuit may be included to selectively reverse the direction of the carrier's travel. Speed control also may be included.

23 Claims, 6 Drawing Sheets

U.S. PATENT DOCUMENTS

| | | | |
|---|---|---|---|
| 3,750,001 | A | 7/1973 | McCloskey |
| 3,788,447 | A * | 1/1974 | Stephanoff .................. 198/619 |
| 3,803,466 | A | 4/1974 | Starkey |
| 3,847,502 | A | 11/1974 | Isbell |
| 3,859,789 | A | 1/1975 | Fawcett et al. |
| 3,862,442 | A | 1/1975 | David |
| 3,883,750 | A | 5/1975 | Uzzell, Jr. |
| 3,902,565 | A | 9/1975 | Farrall |
| 4,019,828 | A | 4/1977 | Bunzer |
| 4,039,848 | A | 8/1977 | Winderl |
| 4,070,131 | A | 1/1978 | Yen |
| 4,104,548 | A * | 8/1978 | Borello ......................... 310/14 |
| 4,107,551 | A | 8/1978 | Akamatsu |
| 4,207,741 | A | 6/1980 | Rainey |
| 4,289,970 | A | 9/1981 | Deibert |
| 4,315,171 | A | 2/1982 | Schaeffer |
| 4,318,019 | A | 3/1982 | Teasley et al. |
| 4,321,020 | A | 3/1982 | Mittal |
| 4,379,972 | A | 4/1983 | Sosa et al. |
| 4,381,181 | A | 4/1983 | Clegg |
| 4,421,452 | A | 12/1983 | Rougemont |
| 4,452,562 | A | 6/1984 | Hsu |
| 4,532,460 | A | 7/1985 | Gale et al. |
| 4,545,729 | A | 10/1985 | Storm |
| 4,644,242 | A | 2/1987 | Takata et al. |
| 4,706,593 | A | 11/1987 | Vail, Jr. |
| 4,779,006 | A | 10/1988 | Wortham |
| 4,803,387 | A * | 2/1989 | Seider ......................... 310/12 |
| 4,815,949 | A | 3/1989 | Rabson |
| 4,816,697 | A | 3/1989 | Nalbandyan et al. |
| 4,958,287 | A | 9/1990 | Sugimura et al. |
| 4,965,864 | A * | 10/1990 | Roth et al. .................. 318/135 |
| 4,969,103 | A | 11/1990 | Maekawa |
| 4,978,071 | A | 12/1990 | MacLean et al. |
| 5,001,357 | A | 3/1991 | Adams |
| 5,009,569 | A | 4/1991 | Hector, Sr. et al. |
| 5,126,604 | A * | 6/1992 | Manning .................... 310/12 |
| 5,143,037 | A | 9/1992 | Sawamoto |
| 5,182,958 | A | 2/1993 | Black |
| 5,195,470 | A | 3/1993 | Ikeura |
| 5,395,598 | A | 3/1995 | Prueitt |
| 5,483,798 | A | 1/1996 | Prueitt |
| 5,525,037 | A | 6/1996 | Cummings |
| 5,588,386 | A | 12/1996 | Schilt |
| 5,786,645 | A | 7/1998 | Obidniak |
| 5,796,194 | A | 8/1998 | Archer et al. |
| 5,823,749 | A | 10/1998 | Green |
| 6,011,334 | A | 1/2000 | Roland |
| 6,049,153 | A | 4/2000 | Nishiyama et al. |
| 6,064,123 | A | 5/2000 | Gislason |
| 6,239,507 | B1 | 5/2001 | Douthit |
| 6,249,059 | B1 | 6/2001 | Hosoda |
| 6,278,197 | B1 | 8/2001 | Appa |
| 6,289,834 | B1 | 9/2001 | Phillips |
| 6,356,001 | B1 | 3/2002 | Nishiyama et al. |
| 6,390,215 | B1 | 5/2002 | Kodama et al. |
| 6,404,151 | B1 | 6/2002 | Bader |
| 6,409,467 | B1 | 6/2002 | Gutterman |
| 6,492,743 | B1 | 12/2002 | Appa |
| 6,537,025 | B2 | 3/2003 | Hopkins et al. |
| 6,552,460 | B2 | 4/2003 | Bales |
| 6,633,151 | B2 | 10/2003 | Johnson |
| 6,734,574 | B2 | 5/2004 | Shin |
| 6,891,294 | B1 * | 5/2005 | Deal ......................... 310/152 |
| 6,952,058 | B2 | 10/2005 | McCoin |
| 7,026,723 | B2 | 4/2006 | Moreno |
| 7,135,786 | B1 | 11/2006 | Deets |
| 7,183,664 | B2 | 2/2007 | McClintic |
| 7,417,334 | B2 | 8/2008 | Uchiyama |
| 2003/0035725 | A1 | 2/2003 | Sosonkina |
| 2003/0178855 | A1 | 9/2003 | Li |
| 2004/0113431 | A1 | 6/2004 | Huang |

FOREIGN PATENT DOCUMENTS

JP  52064711 A * 5/1977

* cited by examiner

ELECTRIC MOTOR WITH A PERMANENT MAGNET CARRIER ROTATING A SPROCKET

CROSS-REFERENCE TO RELATED APPLICATIONS

This application claims the benefit of provisional application Ser. No. 60/917,963, filed May 15, 2007, entitled "Electric Motor," the contents of which are incorporated herein by reference.

FIELD OF THE INVENTION

The present invention relates to electric motors for motor vehicles and other machines.

BACKGROUND OF THE INVENTION

As the cost of oil and gas continues to escalate, the use of alternate energy sources becomes more important. Batteries and fuel cells may be used to power electric motors, but in many applications have impractically short charge duration. The operating period of a motor's battery is determined largely by the current required by the motor, so battery life could be optimized by using a low current motor. However, in many applications, including motor vehicles, relatively high power also is demanded. In such applications, the motor must be high voltage in addition to low current, since power is proportional to the product of the voltage and the current. Thus, there is a need for a high voltage and low current electric motor.

DETAILED DESCRIPTION OF THE PREFERRED EMBODIMENTS

Figure 1:
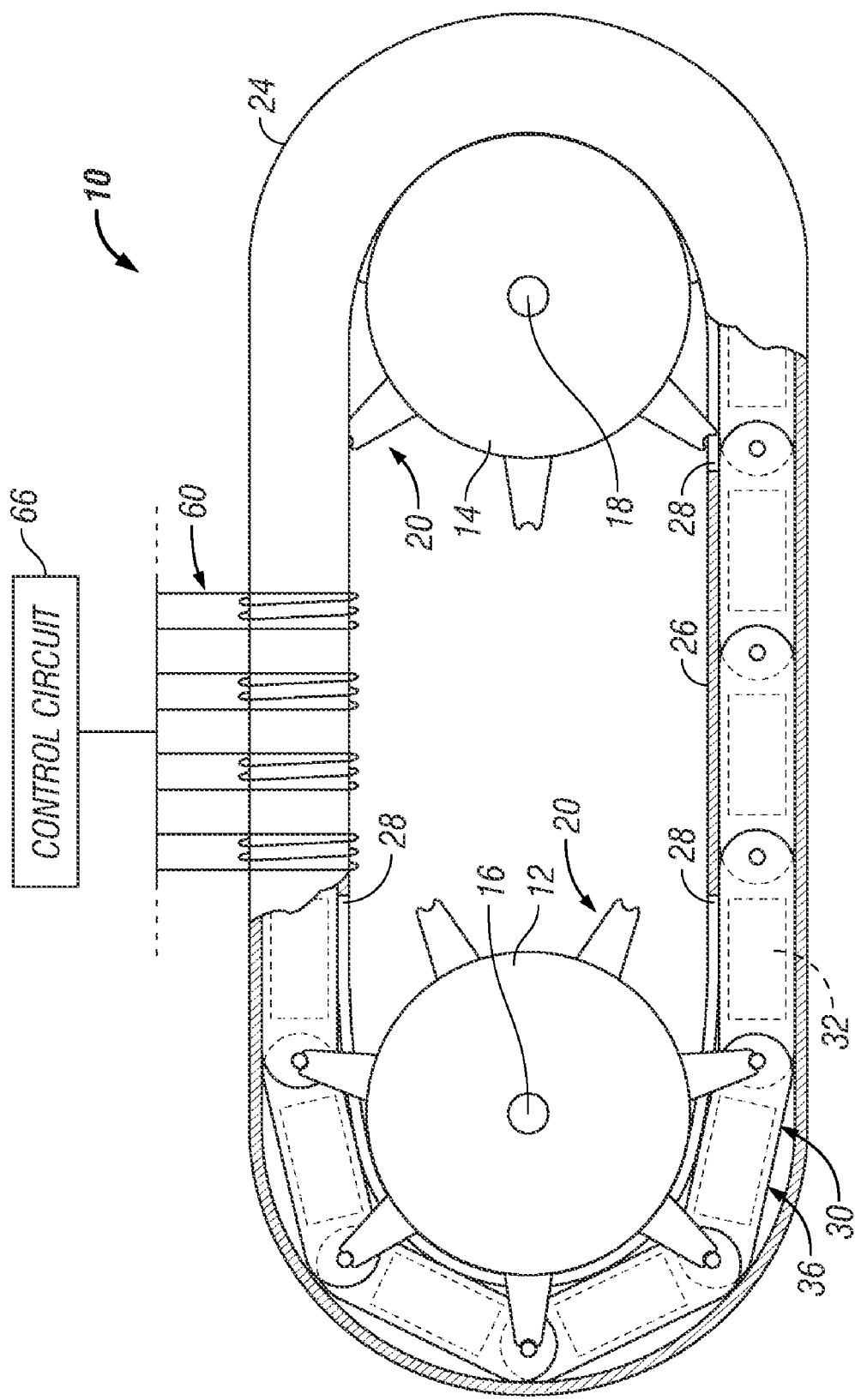
FIG. 1 is a side elevational, semi-schematic, partially fragmented view of an electric motor constructed in accordance with the present invention.

With reference now to the drawings in general and to FIG. 1 in particular, there is shown therein, an electric motor constructed in accordance with the present invention and designated by the reference numeral 10. The electric motor 10 has many uses, such as in electric or hybrid vehicles and various industrial belt drive applications, all of which would benefit from its low current, high voltage characteristics.

The motor 10 comprises at least one sprocket and in the embodiment shown it comprises first and second aligned sprockets 12 and 14 mounted for rotation. Also included is at least one and preferably first and second drive shafts 16 and 18, each fixed for rotation to one of the sprockets 12 and 14. Teeth, designated collectively as 20, project from both sprockets 12 and 14.

Referring still to FIG. 1, the motor 10 further comprises a tubular track such as the tube 24 that forms an endless loop around the sprockets 12 and 14. The tube 24 is mounted so as to be fixed relative to the sprockets 12 and 14.

The tube 24 is formed of non-ferrous material as it will serve as the core for electromagnetic coils to be described later. For example, the tube 24 may be made of aluminum, acrylic, polycarbonate, or other magnetically transparent compositions. It may be provided with a Teflon brand coating on the inside.

Preferably, the tube 24 is circular in cross-section (see FIG. 4), but this may vary. The inner perimeter 26 of the tube 24 includes spaced apart access slots 28 or other openings to allow the teeth 20 of the sprockets 12 and 14 to extend inside the tube.

Supported inside the tube 24 is a carrier 30 for supporting a plurality of permanent magnets designated collectively at 32. The carrier 30 is configured to circulate through the tube 24 and is adapted to engage the sprockets 12 and 14 so that as the carrier circulates through the tube 24 the sprockets 12 and 14 rotate, thereby rotating the drive shafts 16 and 18.

Figure 2:
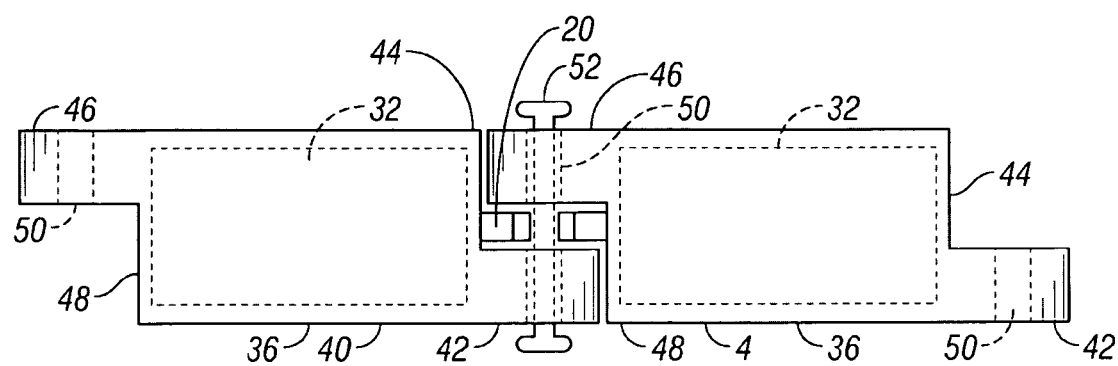
FIG. 2 is a plan view of a pair of links in the chain showing the pivot pin that pivotally connects adjacent links.
Figure 3:
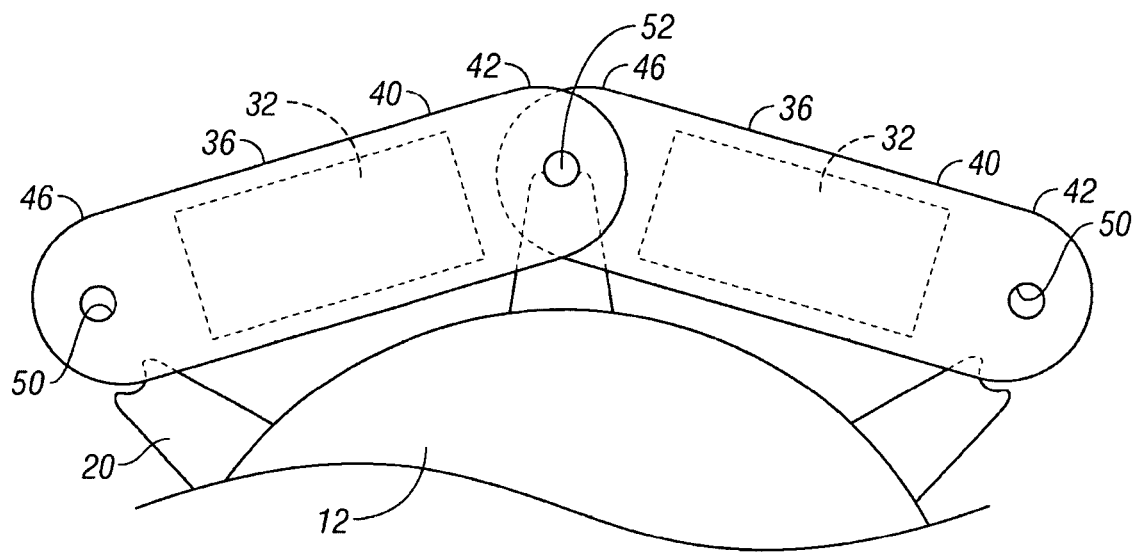
FIG. 3 is an enlarged, fragmented, side elevational view of a segment of one of the sprockets showing how the sprocket teeth engage the pivot pin between each pair of adjacent links.
Figure 4:
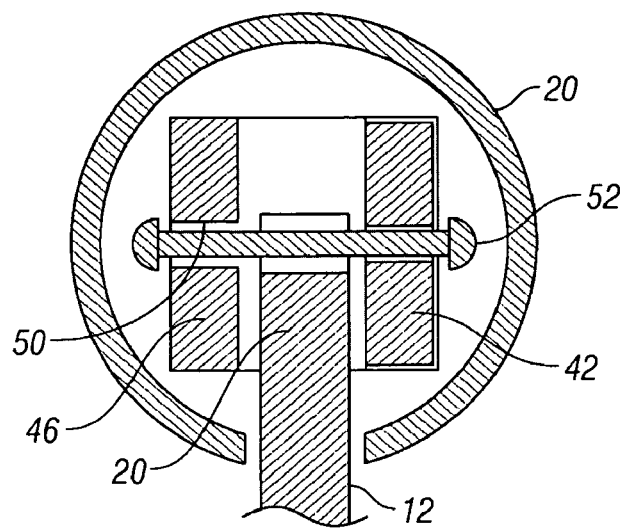
FIG. 4 is a cross-sectional view through the tube containing the chain and showing the sprocket tooth engaging a pivot pin.

Although the structure of the carrier may vary, in a preferred form the carrier 30 is an endless chain composed of a plurality of links designated collectively at 36. Referring now also to FIGS. 2-4, each link 36 preferably is an elongate body 40 with a first tab 42 on first end 44 and a second tab 46 on the second end 48. The tabs 42 and 46 may be offset opposite to each other and provided with holes 50 for receiving a pivot pin 52 (FIG. 4) therethrough in a manner that permits one link to pivot relative to the other for moving through the curved path of the tube 24, as best seen in FIG. 3. As shown in FIGS. 3 and 4, the pins 52 and the sprocket teeth 20 are configured so that as the carrier 30 moves through the tube 24, the teeth engage the pins thus transferring the motion of the carrier to the sprockets 12 and 24.

The body 40 of each link 36 is basically rectangular in shape and may be made of any non-ferrous material, though some suitable plastic is preferred. Preferably, a magnet 32 is contained in the body 40 of link 36. The link may be molded with the magnet embedded inside. Alternately, the link 36 may be a housing with a magnet space inside. In any event, the links 36 should be adapted to carry the magnets 32 in end-to-end arrangement around the tube 24. The size, shape and number of the links may vary widely. In the embodiment shown herein, which is only illustrative, the chain (carrier) 30 comprises 15 links, and each link 36 is four inches long end to end; each magnet 32 is two inches long, and the tabs 42 and 46 are sized to space the magnets in adjacent links 36 one inch apart from end to end.

Referring again to FIG. 1, the electric motor 10 further comprises a plurality of coils designated collectively at 60. While the coils 60 may each be a single winding, a "two in hand" double wound coil is much preferred as this will permit the polarity of the poles to be reversed by selectively energizing the windings in each coil.

Figure 8A:
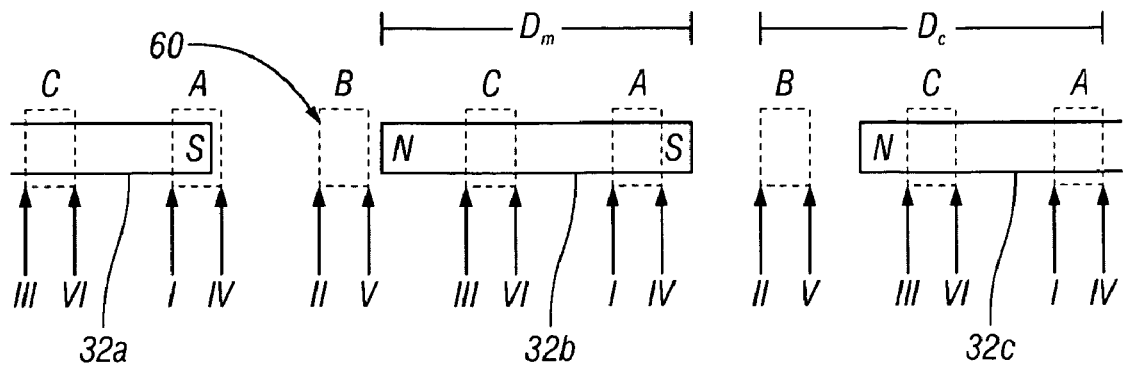
FIGS. 8A and 8B are schematic illustrations of the operation of the pulses from the sequencing circuit on the operation of the coils.

As shown in FIG. 1, each coil 60 is formed around the tube 24, and the coils are spaced apart. Although the number of the coils 60 may vary, it is preferred that the coils 60 continue around the entire tube 24. In the exemplary embodiment shown herein, the coils 60 are one-half inch wide. As explained hereafter, the coils are operated in groups of three. Thus, as shown in FIG. 8A, each group of three coils should be spaced to have the same length "$D_c$" as one of the permanent magnets 32 "$D_m$". That is, the coils 60 should be spaced so that each three coils spans two inches from outside end to outside end.

While many methods of manufacturing the motor 10 will be apparent to those skilled in the art, only one method will be described. The tube 24 may be conveniently formed of commercially available plastic tubing, which is prefabricated in curved and straight segments. When assembled from such tubing, the tube 24 holds its shape but is slightly flexible. The tube 24 may comprise a short open section (not shown in the drawings). Next, the coils are applied to the outside of the tube 24, and the access slots 28 are formed. After the coils 60 are in place, the chain 30 is threaded through one end of the open segment in the tube 24. Before connecting the ends of the chain, the tube 24 is wrapped around the sprockets 12 and 14 so that the teeth 20 engage the pins 52 between the links 36.

Now it will be apparent that, when selectively energized in sequence, the coils 60 will attract and repel the magnets 32 inside the tube 24 in a manner that urges the carrier 30 around inside. A control circuit 66 is provided for this purpose. The control circuit 66 is operatively engaged, such as by conventional wiring, with each of the coils 60 to energize the coils in response to a sequencing circuit 68 (FIG. 5) for sequentially energizing the coils to move the carrier 30 in the tube 24.

Figure 5:
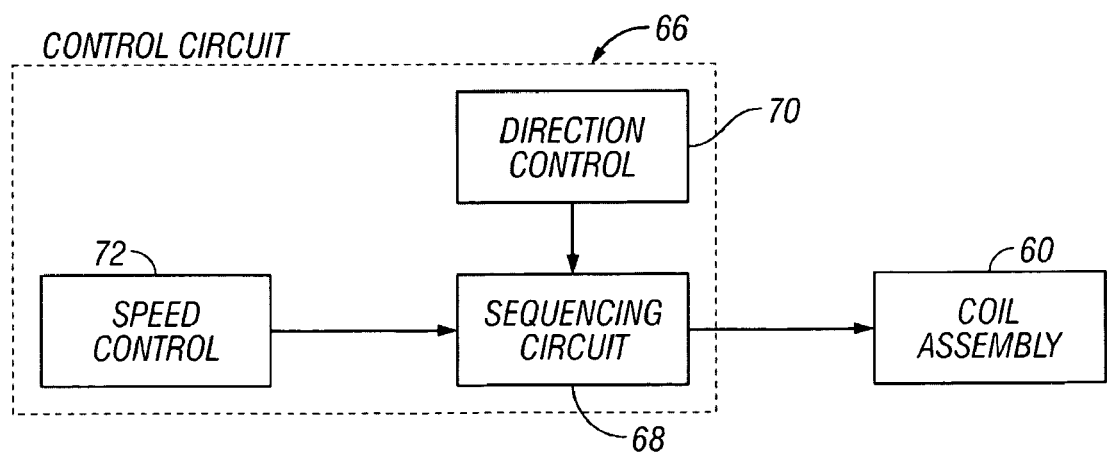
FIG. 5 is schematic diagram of the motor's control circuit.

A preferred control circuit 66 is shown in FIG. 5 and generally includes the sequencing circuit 68 that is operatively connected to the assembly of coils 60. The preferred control circuit 66 also includes a direction control circuit 70 for allowing the carrier 30 moved bi-directionally, that is, in forward mode and reverse mode. Still further, the control circuit 66 also preferably includes a speed control circuit 72 for varying the speed at which the carrier 30 moves.

Figure 6:
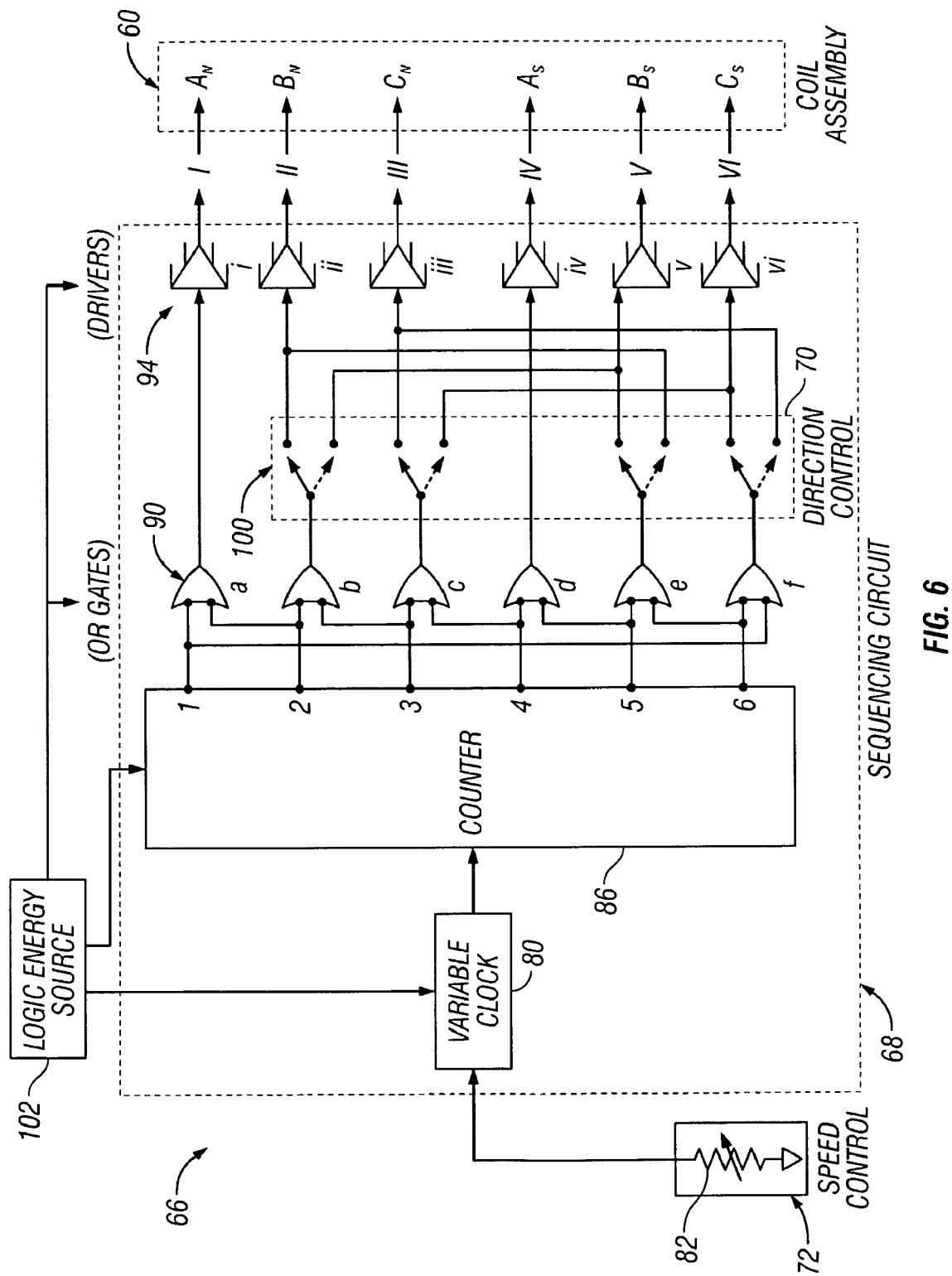
FIG. 6 is a more detailed schematic diagram of the motor's control circuit.

FIG. 6, to which attention is now directed, illustrates a preferred design for a sequencing circuit 68 with speed and direction control. As explained previously, the plurality of coils 60 in the preferred motor 10 includes a number of coils that is a multiple of three forming a plurality of coil sets of three coils each. Each coil set include a first or "A" coil, a second or "B" coil, and a third or "C" coil. The sequencing circuit 68 then is configured to energize the A coil in every group simultaneously, the "B" coil in each group simultaneously, and the "C" coil in each group simultaneously. As will be explained further below, the order in which the coils are energized, and which of its two windings is energized, will determine the direction in which the magnets are urged.

The sequencing circuit 68 comprises a clock, and preferably a variable clock 80, for providing an output in the form of an energy pulse. Where it is desired to have a motor with a variable speed, the speed control circuit 72 is included to vary the frequency of the pulse emitted from the clock 80. A variable resistor 82 is shown here, but other devices may be substituted effectively, such as a capacitor or inductor.

The preferred sequencing circuit 68 preferably also includes a counter 86 adapted to receive the energy pulses from the power clock 80 and to produce sequential pulsed outputs. In the circuit 68 shown, the counter has six outputs, designated 1 through 6.

With continuing reference to FIG. 6, the sequencing circuit 68 includes a matrix of OR gates 90, the gates 90 being designated individually as a, b, c, d, e, and f. The OR gates 90 are adapted to receive the sequential outputs of the counter 86 and to provide two consecutive pulses to each coil winding with each output, for a reason to be explained. To that end, the output 1 from the counter 86 is connected to the input of OR gates a and f; the output 2 from the counter 86 is connected to the input of OR gates a and b; the output 3 from the counter 86 is connected to the input of OR gates b and c; the output 4 from the counter 86 is connected to the input of OR gates c and d; the output 5 from the counter 86 is connected to the input of OR gates d and e; the output 6 from the counter 86 is connected to the input of OR gates f and a.

When arranged thusly, there will be an output from the first and sixth OR gates a and f every time the counter 86 emits a signal at 1. There will be an output from the first and second OR gates a and b every time the counter emits a signal at 2. There will be an output from the second and third OR gates b and c every time the counter emits a signal at 3. There will be an output from the third and fourth OR gates c and d every time the counter emits a signal at 4. There will be an output from the fourth and fifth OR gates d and e every time the counter emits a signal at 5. There will be an output from the fifth and sixth OR gates e and f every time the counter emits a signal at 6.

The sequencing circuit 68 further comprises a matrix of drivers such as the distribution amplifiers 94 individually designated at i, ii, iii, iv, v, and vi. The use of distribution amplifiers allows the output from one OR gate to be input to multiple coils. The amplifiers 94 are adapted to receive the outputs of the OR gates 90 and to transmit the outputs from the OR gates to each of the coils 60.

Outputs I and IV from drivers i and iv are input to A coils: output I to the left winding, and output IV to the right winding. Outputs II and V from drivers ii and v are input to the B coils: output II to the left winding, and output V to the right winding. Outputs III and VI from drivers iii and vi are input to the C coils: output III to the left winding, and output VI to the right winding. Now it will be understood that the I, II, III<IV, V, and VI outputs from the amplifiers 94 will energize the coils 60 in the order of A-B-C, A-B-C and so forth to move the carrier 30 in a first direction.

Referring still to FIG. 6, the direction control circuit 70 preferably comprises switches, such as a four-pole, double-throw switch 100. The direction control circuit 70 is configured to reverse the order in which sequencing circuit 68 energizes the coils 60 so that the direction of the carrier 30 is reversed. Thus, the position of the switch 100 shown in solid lines is the forward condition, that is, it is connected to cause the output from the OR gates 90 to energize the coils 60 in the order of A-B-C to move the carrier 30 in a first or "forward" direction. The switch position shown in broken lines causes the outputs from the OR gates 90 to energize the coils 60 in the order of A-C-B, thereby causing the carrier 30 to move in a second and opposite direction or "reverse."

Power from the logic energy source 102 is supplied to the clock 80, the counter 86, each of the OR gates 90, and each of the amplifiers 94. This energy source may be a battery, for example.

Figure 7:
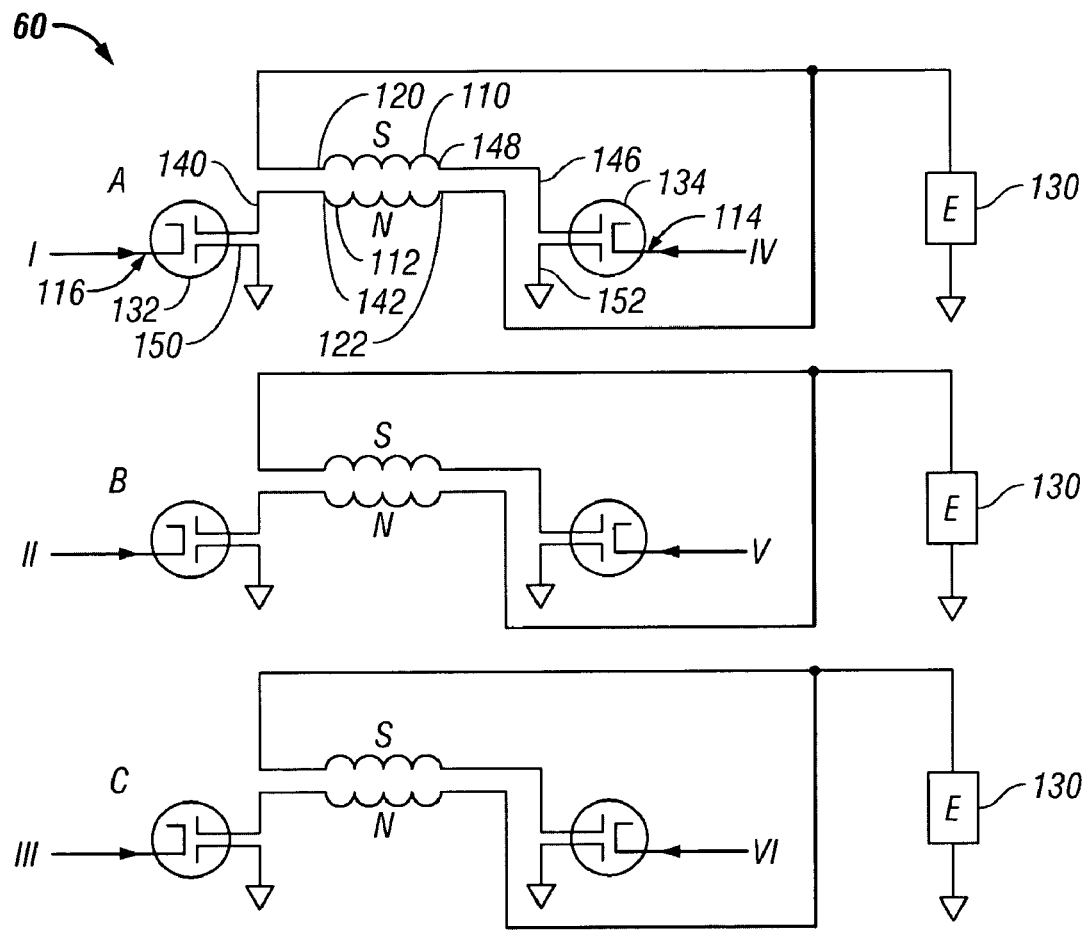
FIG. 7 is a schematic diagram of the motor's coil operating circuit.

Turning now to FIG. 7 there is shown therein a coil operating circuit that may be employed in the motor 10 of the present invention. In this embodiment, each winding in each double wound coil 60 is provided with its own coil operating circuit, and each of the A, B and C coils are similarly wired. Only one A coil will be described in detail.

Coil A comprises the windings 110 and 112 each with a coil operating circuit 114 and 116. The first terminal 120 and 122 of each winding 110 and 112 is connected to an energy source 130, there being a separate energy source for each coil. Preferably, the energy sources 130 are batteries, but fuel cells also may be used.

Each coil operating circuit 114 and 116 preferably includes a MOSFET 132 and 134, respectively, for turning the windings 110 and 112 off and on. The input of each MOSFET is connected to one of the amplifier outputs I, II, III, IV, V, or VI (FIG. 6). For example, the output I is input to the MOSFET 132 and the output IV is input to the MOSFET 134.

One output 140 of the MOSFET 132 is connected to the second terminal 142 of the winding 112, and the output 146 of the MOSFET 134 is connected to the second terminal 148 of the winding 110. The second outputs 150 and 152 of the MOSFET's 132 and 134 are connected to ground.

Figure 8B:
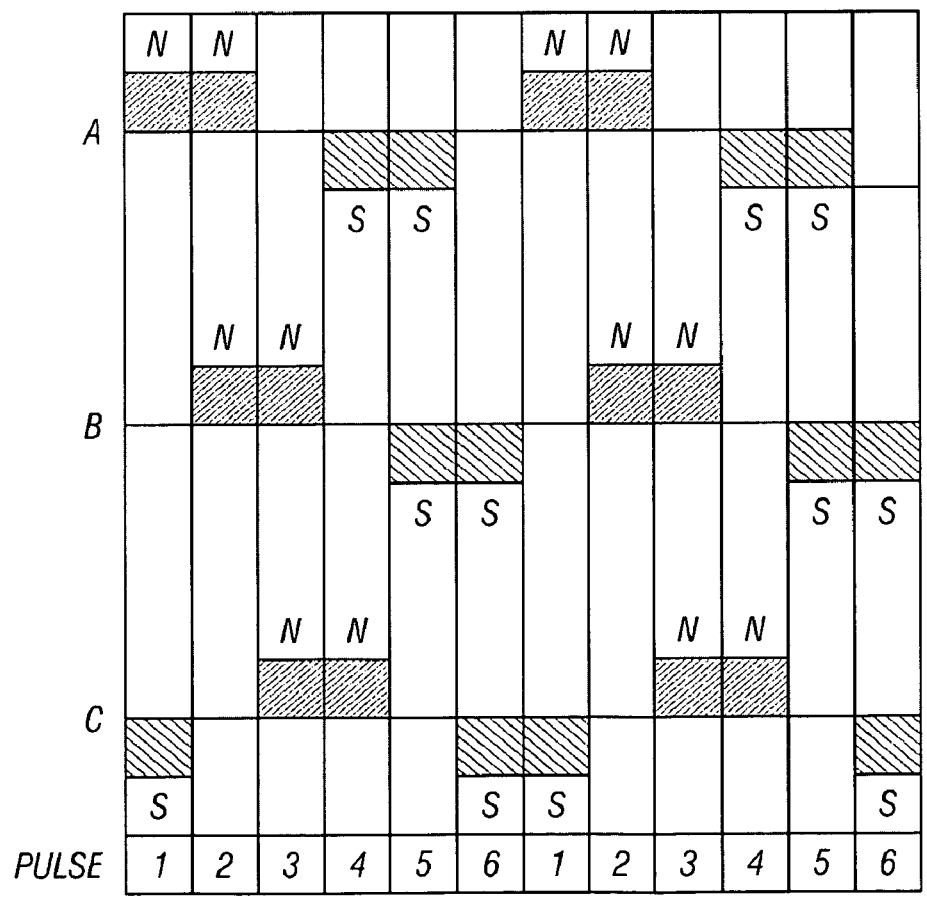

The operation of the coils 60 is illustrated schematically in FIGS. 8A and 8B, to which reference now is made. FIG. 8A shows the magnets 32a, 32b, and 32c, having North, South, North, South alternating polarities as indicated. The carrier 30 (FIG. 1) in which the magnets 32 are supported is not shown in these figures to simplify the illustration. The coils 60 are indicated only schematically in broken lines and are designated sequentially A, B and C. The inputs from the control circuit 66 are indicated by the numerals I, II, II, IV, V, and VI. The inputs to the left end of each coil indicating control of the first winding, and the inputs to the right end of each coil indicating control of the second winding.

When a pulse is input from I into the first winding of the A coils, all the A coils are simultaneously polarized North; when the second winding of the A coils is energized by an IV input, all the A coils are simultaneously polarized South. As illustrated in the FIG. 8B, because of the two consecutive inputs to the OR gates, as explained above, the polarity of each coil is sustained for two consecutive pulse periods.

In response to the first pulse from the counter 86 (FIG. 6), there is an input I and VI to make the A coils North and the C coils South simultaneously for one pulse period. In response to the second pulse from the counter 86, there is a second input I to maintain the North polarity of the A coils for a second continuous period and an input II to make the B coils North simultaneously for one pulse period. In response to a third pulse from the counter 86, there is second input II to maintain the North polarity of the B coils for a second pulse period and to input III to the C coils to create a South polarity simultaneously for one pulse period. In response to the fourth pulse from the counter 86, there is a second input III to the C coil to maintain its North polarity for a second pulse period and a input IV to the second winding of the A coil to produce a South polarity. In response to the fifth pulse from the counter 86, there is a second input IV to the second winding of coil A to maintain its South polarity for a second continuous pulse period and an input V to the B coils to give them a South polarity. In response to the sixth output of the counter 86, the V output to the B coils maintains their South polarity and now another I output to the first winding of the A coil to return it to the North polarity.

This process repeats, creating a rolling or progressive polarity in the coils 60 that both pulls and repels the permanent magnets 32 to urge them through the carrier (not shown in FIGS. 8A and 8B). This is seen best in FIG. 8B.

Now it will be seen that the present invention provides a simple and efficient closed loop system that is high voltage due to the large number of coils that can be employed and yet is low current because each coil has its own power source.

U.S. Pat. No. 6,891,294, entitled "Electric Motor Vehicle Comprising Same," [sic] issued May 10, 2005, is incorporated herein by reference.

For the purpose of this description, the words left, right, front, rear, top, bottom, upper, lower, inside and outside may be used to describe the various parts and directions of the invention as depicted in FIG. 1. These descriptive terms should not be considered as limiting the possible orientations of the invention or how it may be used. The terms are merely used to describe the various parts and directions so they may be readily understood and located in the drawings.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. An electric motor comprising:
   at least one rotatable sprocket;
   at least one drive shaft fixed for rotation with the sprocket;
   a non-ferrous tube forming an endless loop around the at least one sprocket;
   a carrier configured to circulate through the tube, the carrier engaged with the at least one sprocket whereby as the carrier circulates through the tube the at least one sprocket rotates;
   a plurality of permanent magnets arranged end-to-end in the carrier;
   a plurality of coils, each coil formed around the tube and spaced apart from each other coil, and each coil connectable to a power source;
   a control circuit operatively engaged with each of the plurality of coils and including a sequencing circuit for sequentially energizing the coils to move the carrier by repelling or attracting the magnets thereby causing the carrier to circulate around the tube rotating the at least one sprocket and the at least one drive shaft.

2. The electric motor of claim 1 wherein tube is circular in cross section.

3. The electric motor of claim 1 wherein the at least one sprocket includes a first a second sprocket and wherein the at least one drive shaft comprises a first drive shaft fixed for rotation with the first sprocket and a second drive shaft fixed for rotation with the second drive shaft.

4. The electric motor of claim 1 wherein the carrier is a chain comprising a plurality of links.

5. The electric motor of claim 4 wherein each link comprises a block of plastic and wherein one of the plurality of magnets is embedded in the block of each link.

6. The electric motor of claim 5 where each link comprises a first end and a second end, the first end pivotally connected to the second end of the preceding link and the second end pivotally connected to the first end of the succeeding link.

7. The electric motor of claim 6 wherein the chain comprises a pivot pin for making the pivotal connection between each pair of adjacent links in the chain and wherein the at least one sprocket comprises a plurality of radially projecting teeth, each such tooth configured to engage the pivot pins in the chain.

8. The electric motor of claim 7 wherein the tube is circular in cross section and wherein the inner perimeter of the tube includes access slots through which the sprocket teeth engage the pivot pins.

9. The electric motor of claim 1 wherein the number of coils in the plurality of coils equals three times the number of magnets in the plurality of magnets.

10. The electric motor of claim 1 wherein each of the coils is double wound and the operating circuit includes a direction control circuit.

11. The electric motor of claim 10 wherein the number of coils in the plurality of coils equals three times the number of magnets in the plurality of magnets.

12. The electric motor of claim 1 wherein the sequencing circuit comprises:
   a power clock adapted to produce energy pulses;
   a counter adapted to receive the energy pulses from the power clock and to produce sequential outputs each output corresponding to one of the plurality of coils;
   a matrix of OR gates adapted to receive the sequential outputs of the counter and to sustain the pulse from each sequential output for the duration of two clock pulses; and
   a matrix of drivers adapted to receive the outputs of the OR gates and to transmit the outputs from the OR gates to each of the plurality of coils.

13. The electric motor of claim 12 wherein the power clock in the sequencing circuit is a variable power clock and wherein the control circuit further comprises a speed control circuit comprising means for varying the frequency of the pulses in the variable power clock.

14. The electric motor of claim 13 wherein the control circuit further comprises a direction control circuit to reverse the order in which the sequencing circuit energizes the plurality of coils.

15. The electric motor of claim 14 wherein the control circuit includes a coil operating circuit for each of the plurality of coils, wherein each of the coils comprises double windings, and wherein each of the coil operating circuits comprises a MOSFET for each winding.

16. The electric motor of claim 1 wherein the plurality of coils includes a number of coils that is a multiple of three forming a plurality of coil sets of three coils each, each coil set including first, second and third coils, wherein the sequencing circuit is configured to energize the first coil in every group simultaneously, the second coil in each group simultaneously, and the third coil in each group simultaneously, and wherein the sequencing circuit is configured to energize the coils in each coil set in at least a selected order.

17. The electric motor of claim 16 wherein the sequencing circuit comprises a direction control circuit configured to reverse the order in which sequencing energize the coils in the coil sets so that the direction of the carrier is reversed.

18. The electric motor of claim 1 wherein the control circuit further comprises a direction control circuit to reverse the order in which the sequencing circuit energizes the plurality of coils.

19. The electric motor of claim 18 wherein the direction control circuit comprises switches adapted to reverse the order in which the sequencing circuit energizes the plurality of coils.

20. The electric motor of claim 1 wherein the control circuit comprises a speed control circuit.

21. The electric motor of claim 20 wherein the sequencing circuit comprises a variable power clock and wherein the speed control circuit comprises means for varying the frequency of the pulses emitted by the variable power clock.

22. The electric motor of claim 21 wherein means for varying the frequency of the pulses in the variable power clock comprises a variable resistor.

23. The electric motor of claim 20 wherein the control circuit further comprises a direction control circuit to reverse the order in which the sequencing circuit energizes the plurality of coils.

\* \* \* \* \*